United States Patent [19]
Hediger

[11] Patent Number: 5,937,794
[45] Date of Patent: Aug. 17, 1999

[54] SLED DOG HARNESS

[76] Inventor: Ernst H. Hediger, W5770 Wildwood Rd., Neillsville, Wis. 54456

[21] Appl. No.: 08/966,331

[22] Filed: Nov. 7, 1997

[51] Int. Cl.⁶ .......................... A01K 29/00; A01K 27/00
[52] U.S. Cl. ................................. 119/856; 119/907; 54/1
[58] Field of Search ...................... 119/771, 792, 119/793, 856, 907; 54/1

[56] References Cited

U.S. PATENT DOCUMENTS

| | | |
|---|---|---|
| 1,099,823 | 6/1914 | Saxe . |
| 2,233,397 | 3/1941 | Bloom ........................................ 54/1 X |
| 2,437,628 | 3/1948 | Warren ....................................... 240/59 |
| 2,475,870 | 7/1949 | Ballentine ...................................... 54/1 |
| 3,768,445 | 10/1973 | Sorrels . |
| 4,528,944 | 7/1985 | Reed et al. . |
| 5,427,061 | 6/1995 | McCullough ............................ 119/771 |
| 5,471,953 | 12/1995 | Sporn ....................................... 119/792 |
| 5,845,606 | 12/1998 | Hartman ................................... 119/856 |

*Primary Examiner*—Robert P. Swiatek
*Attorney, Agent, or Firm*—Norman B. Rainer

[57] ABSTRACT

A harness for a dog such as a sled dog is fabricated of strap segments which provide a neck yoke of adjustable size having upper and lower V-shaped junctures, a longitudinal cushioned panel configured to reside against the underside of the dog, and paired oblique back and side segments which permit adjustability to the length of the dog.

10 Claims, 2 Drawing Sheets

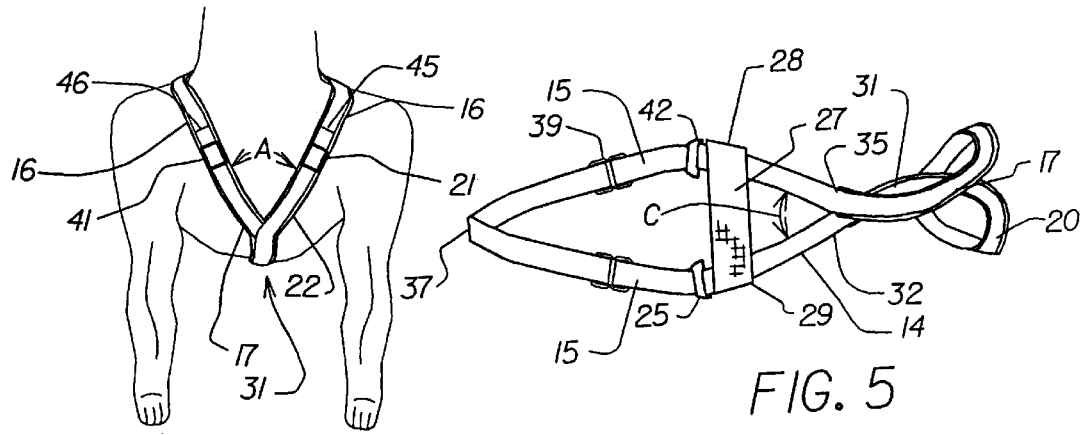
FIG. 2
FIG. 5
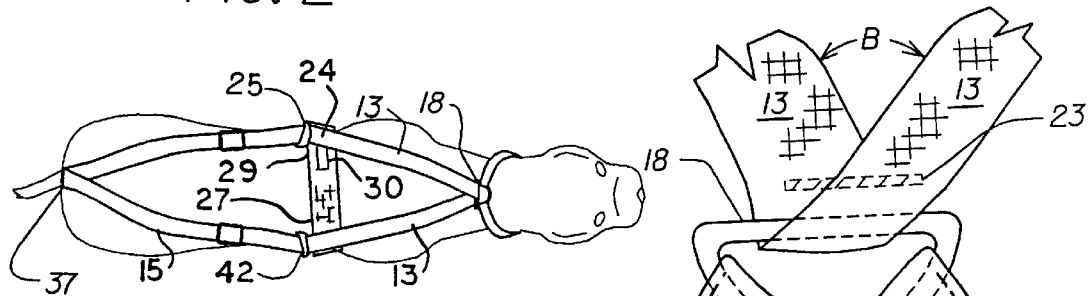
FIG. 3
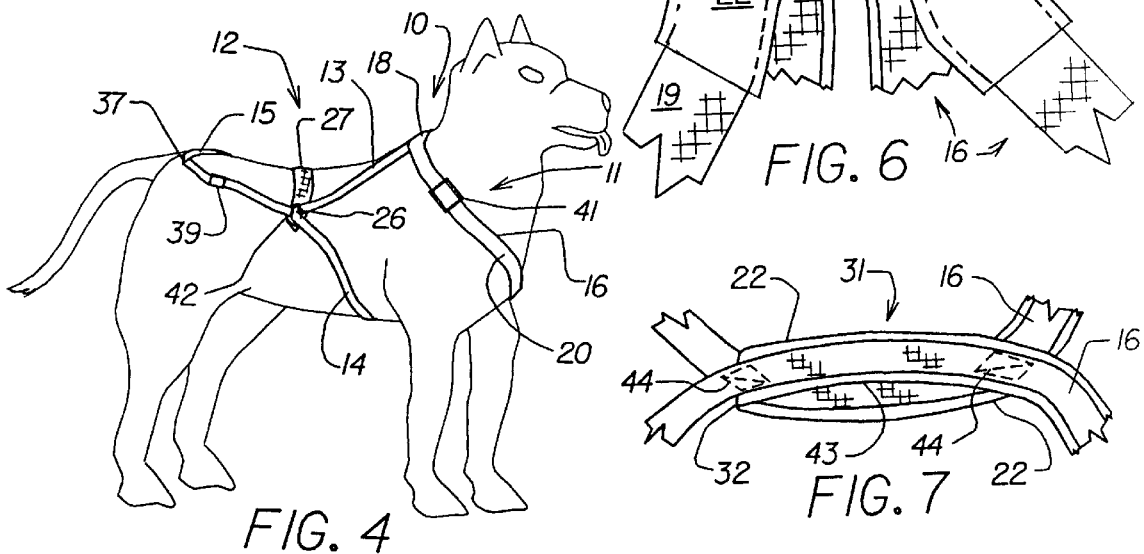
FIG. 6
FIG. 4
FIG. 7

SLED DOG HARNESS

BACKGROUND OF THE INVENTION

1. Field of the Invention

This invention concerns a harness for dogs used for the pulling transport of a sled or other conveyance.

2. Description of the Prior Art

The use of dog harnesses as a means for attachment of a controlling leash is well known. Specialized types of harnesses have also been disclosed, as in U.S. Pat. No. 4,528, 944, which concerns a harness designed to facilitate the exercising of dogs, and in U.S. Pat. No. 5,471,953 which discloses a harness that inhibits a dog from straining against the securing leash. The need for dog harnesses of adjustable size has been recognized in U.S. Pat. No. 3,768,445.

In the case of working dogs trained for pulling, special factors must be taken into consideration with respect to harness design. For example, U.S. Pat. No. 2,475,870 to Ballentine concerns a draft harness by means of which a dog may pull a wagon or sled, and addresses the need of the harness to accommodate the natural forward inclination of the dog during its pulling activity. However, the Ballentine harness is not readily amenable to size adjustments, nor does it provide for comfort or ease of placement onto the dog. It is generally considered that particular care must be taken to avoid a choking effect when the dog is forwardly angled during pulling motion. Any undue pressure on the dog's throat muscles, windpipe, cords or nerves could adversely affect the well-being of the dog on a transient or permanent basis. Although prior art harnesses have addressed certain specific features, the development of a satisfactory harness for sled dogs has not previously been achieved.

It is accordingly an object of the present invention to provide a harness for sled dogs.

It is another object of this invention to provide a sled dog harness which is of adjustable size with respect to the body length and neck circumference of the dog.

It is a further object of the present invention to provide a harness of the aforesaid nature which is quickly and easily deployed upon a sled dog.

It is a still further object of this invention to provide a harness of the aforesaid nature which is comfortable to the sled dog.

It is yet another object of the present invention to provide a harness of the aforesaid nature which is of durable, simple construction amenable to low cost manufacture.

These objects and other objects and advantages of the invention will be apparent from the following description.

SUMMARY OF THE INVENTION

The above and other beneficial objects and advantages are accomplished in accordance with the present invention by a dog harness comprising:

a) a neck yoke comprised of two opposed cushioned front strap segments of adjustable length extending between a lower junction of fixed interengagement intended to reside against the dog's chest, and a slidably adjustable upper junction, said lower junction having an upwardly directed V-shape, and said upper junction having a downwardly directed V-shape, b) paired oblique back strap segments affixed to said upper junction and extending rearwardly in opposed V-shaped juxtaposition, terminating in rear extremities that fixedly engage laterally opposed attachment rings, c) a transverse length of webbing adapted to rest upon the dog's back and extending between the rear extremities of said back strap segments, d) a longitudinal cushioned panel configured to reside against the underside of the dog and extending from the lower junction of said neck yoke to a rearward extremity, e) paired oblique side strap segments extending downwardly and forwardly from fixed engagement with said attachment rings to convergent fixed engagement with the rearward extremity of said longitudinal panel and forming therewith a V-shaped junction, and f) paired tether straps of adjustable length secured to said attachment rings and extending rearwardly therefrom to fixed interengagement in V-shaped juxtaposition in a rear junction.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 2 is a front view of the embodiment of FIG. 1.

FIG. 3 is a top view.

FIG. 4 is a side view.

FIG. 5 is a bottom view.

FIG. 6 is an enlarged top fragmentary view.

FIG. 7 is an enlarged fragmentary bottom view.

DESCRIPTION OF THE PREFERRED EMBODIMENT

Figure 1:
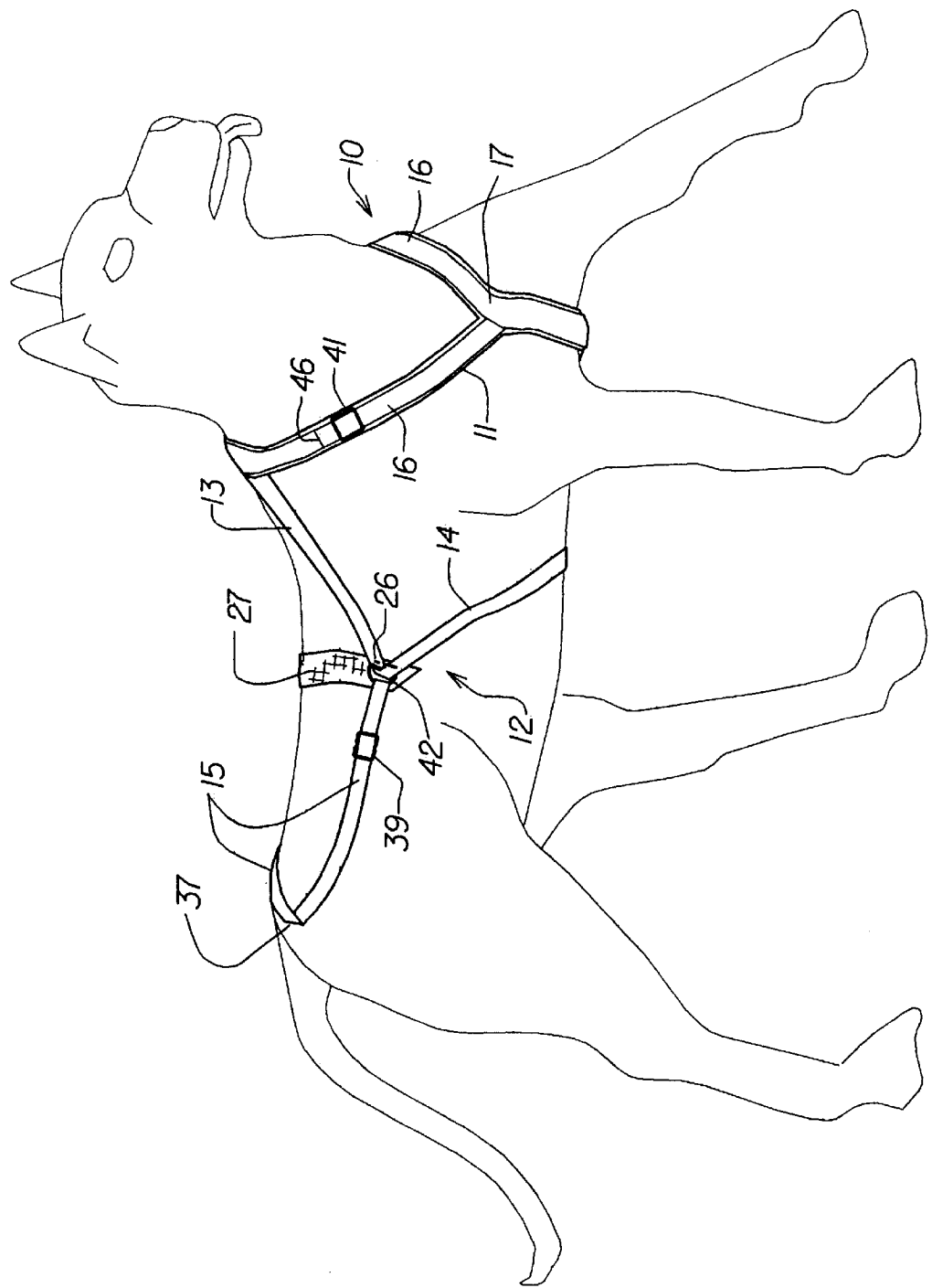
FIG. 1 is a front and side perspective view of an embodiment of the harness of the present invention shown functionally emplaced upon a sled dog.

Referring now to FIGS. 1–7, an embodiment of the harness of the present invention is shown comprised of a forward extremity 10 having a neck yoke 11, a middle region 12 having paired oblique back strap segments 13, paired oblique side strap segments 14, and a cushioned longitudinal panel 31, and a rear region having paired tether straps 15.

Neck yoke 11 is comprised of two opposed front strap segments 16 extending between a lower junction 17 of fixed interengagement intended to reside against the dog's chest, and a slidably adjustable upper junction in the form of forward ring 18 intended to reside centered over the dog's withers close to the base of the neck. Strap segments 16 have interior surfaces 19 and opposed, outwardly directed surfaces 20. Strap segments 16 are of adjustable effective length by virtue of securing means in the form of left and right buckles 21 and 41, respectively, disposed on surfaces 20 which permit controlled lengths of said straps to pass through and around ring 18 and double back downwardly upon outer surface 20 of the belt. Ring 18 is preferably of D configuration with the flat portion of the ring rearwardly directed. The arcuate portion of D-ring 18 slidably engages strap segments 16.

The interior surfaces 19 of strap segments 16 are provided with cushioning material 22 for the comfort of the dog. Various kinds of cushioning material may be employed having good durability with respect to wear and the affects of outdoor weather factors. A particularly suitable cushioning material is "Polartec", a non-water-absorbing product of Malden Mills company of Lawrence, Mass. For further comfort, the cushioning material may be comprised of a layer of closed cell foam sheet material placed beneath an outer layer such as said "Polartec" material. Strap segments 16 are fabricated of nylon fiber in a woven construction having widths between ¾ and 1 ¼ inches. The cushioning material is sewn to the interior surfaces 19 of straps 16, terminating at an upper site which immediately precedes passage of straps 16 through buckle 21. It is particularly important that said interior surfaces are of a non-abrasive and non-water absorbent nature. Substrates that absorb liquid phase water stiffen in sub-freezing temperatures, and the stiffened belts exert a rasp-like effect upon the dog's shoulders.

Lower junction 17, constituting a sewn interconnection of strap segments 16, has an upwardly directed V-shape. The angle of said V-shape, shown as angle A, is between 50 and 80 degrees.

Paired oblique back strap segments 13 of equal length are affixed to the flat portion of ring 18 as by a line of sewing 23. Straps 13 extend rearwardly from ring 18 in opposed V-shaped juxtaposition. The magnitude of the angle of said V-shape, designated as angle B, is between 40 and 60 degrees. Strap segments 13, fabricated of woven nylon, have a width of between ¾ and 1 ¼ inch, and terminate in rear extremities 24 that fixedly engage laterally opposed rear left and right attachment rings 25 and 42, respectively, which are preferably of D-configuration. The attachment of straps 13 to rings 25 and 42 is preferably at the flat portions of the D-rings, and the straps are anchored to the rings by means of sewn lines 26.

A transverse length of flat webbing 27, adapted to rest across the dog's back, extends between the rear extremities 24 of said oblique back strap segments. At least one lateral extremity 28 of webbing 27 is affixed as by sewing to one of the extremities 24 of said oblique back strap segments. The other extremity 29 of webbing 27 is preferably releasibly secured to the opposite rear extremity 24 of said oblique back strap segments. Such releasible securement, which facilitates adjustment of the effective length of transverse webbing 27, involves the use of a hook and loop attachment substrate 30. Webbing 27, in the nature of automotive seat belt webbing, is preferably at least 2 inches wide in order to provide comfort to the dog. It is further disposed below rings 25 and 42 to prevent said rings from rubbing against the dog.

Suitable hook and loop type attachment material is commercially available under the trademark VELCRO from the Velcro) Corporation of Manchester, New Hampshire. Such hook and loop attachment or fastening material involve paired interactive members, each comprising a compliant base sheet having an upraised pile of synthetic fibers. The fibers of one member are in the form of loops. The fibers of the other interactive member are cut loops, which constitute hooks. When the two members of the fastening system are pressed together in face-to-face relationship, there is substantial engagement of hook fibers with loop fibers. A considerable effort must be applied to separate the members unless they are peeled apart, in which event the members are easily separated.

Longitudinal cushioned panel 31, configured to reside against the chest and underside of the dog, extends downwardly and rearwardly from the lower junction 17 of said neck yoke to El rearward extremity 32. Panel 31 is preferably a continuous integral extension of strap segments 16 of said neck yoke and widened by virtue of side by side sewn joinder of said strap components. The length of panel 31, measured between lower junction 17 and rearward extremity 32, is between about 6 and 12 inches, representing between about 40% and 60% of the length of straps 16 of said neck yoke.

Paired oblique side strap segments 14 of equal length extend downwardly and forwardly from fixed engagement with attachment rings 25 and 42, and converge to terminal extremities 35 which meet in a fixedly sewn V-shaped configuration at the rearward extremity 32 of longitudinal panel 31. The angle of said V, designated as angle C, is between 50 and 70 degrees.

In a preferred embodiment of the invention, a single piece of strap material is employed in the construction of said neck yoke and middle region. Such single piece of strap begins at one of its extremities 45 near left buckle 21, then travels upwardly to a first sliding passage around the arcuate portion of D-ring 18, then downwardly and rearwardly where it becomes incorporated into panel 31, then continues rearwardly and around the flat portion of left attachment ring 25, then forwardly to passage around the flat portion of D-ring 18, then rearwardly again and around the flat portion of the right attachment ring 42, then downwardly and forwardly to incorporation within panel 31, then forwardly and upwardly for a second sliding passage around the arcuate portion of ring 18, then downwardly to engagement with right buckle 41, terminating in second extremity 46. In the course of such travel, the strap is immobilized by way of sewn interengagement, designated by numerals 23 and 26, at its three sites of passage around the flat portions of said D-rings. The forwardly and rearwardly directed passes of the single strap are interengaged by longitudinal and transverse lines of sewing 43 and 44, respectively, to produce panel 31, as shown in FIG. 7. Such construction using a single strap with several sites of immobilization creates a very stable framework effect.

Paired tether strap segments 15, which may be portions of a single, doubled strap, slidably engage attachment rings 25 and 42; and extend rearwardly therefrom to fixed interengagement in V-shaped juxtaposition in a rear junction 37. The effective lengths of straps 15 are adjustable by way of buckles 39 which secure varied lengths of strap that doubles back from said attachment rings. A straight tether line or other means may engage said rear junction 37 and extend rearwardly to attachment with the sled, person or other conveyance.

In view of the aforesaid components and their nature of interaction, a comfortable, durable harness is provided which is easy to install and easily adjustable to fit dogs of different sizes. The simplicity of construction is amenable to low cost manufacture.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A dog harness comprising:
   a) a neck yoke comprised of two opposed cushioned front strap segments of adjustable length extending between a lower junction of fixed interengagement configured to reside against the dog's chest, and a slidably adjustable upper junction, said lower junction having an upwardly directed V-shape, and said upper junction having a downwardly directed V-shape,
   b) paired oblique back strap segments affixed to said upper junction and extending rearwardly in opposed V-shaped juxtaposition, terminating in rear extremities that fixedly engage laterally opposed attachment rings, c) a transverse length of webbing adapted to rest upon the dog's back and extending between the rear extremities of said back strap segments, d) a longitudinal cushioned panel configured to reside against the underside of the dog and extending from the lower junction of said neck yoke to a rearward extremity, e) paired oblique side strap segments extending downwardly and forwardly from fixed engagement with said attachment rings to convergent fixed engagement with the rearward extremity of said longitudinal panel and forming therewith a V-shaped junction, and f) paired tether strap segments of adjustable length secured to said attachment rings and extending rearwardly therefrom to fixed interengagement in V-shaped juxtaposition in a rear junction.

2. The harness of claim 1 wherein said upper junction includes a forward ring which slideably engages said front strap segments and fixedly engages said paired oblique back strap segments.

3. The harness of claim 2 wherein said forward ring has a D-shaped configuration having a rearwardly directed flat portion and forwardly directed arcuate portion which engages said front strap segments.

4. The harness of claim 1 wherein said transverse length of webbing releasibly and adjustably engages the rear extremities of said back strap segments.

5. The harness of claim 4 wherein the releasible engagement achieved with interactive hook and loop attachment material.

6. The harness of claim 1 wherein said laterally opposed attachment rings are of D-shaped configuration.

7. The harness of claim 1 wherein said longitudinal panel is fabricated by way of the side-by-side sewn interengagement of said front strap segments.

8. The harness of claim 1 wherein the upwardly directed V shape of said lower junction has an angle between 50 and 80 degrees.

9. The harness of claim 1 wherein said cushioned front strap segments are comprised of a layer of cushioning material which does not absorb water.

10. The harness of claim 1 wherein said front strap segments, paired oblique back strap segments and paired oblique side strap segments are all portions of a single continuous length of strap material.

* * * * *